US012749930B2

(12) United States Patent
Zhang et al.

(10) Patent No.: US 12,749,930 B2
(45) Date of Patent: Sep. 29, 2026

(54) ELECTRONIC DEVICE AND STYLUS IN-POSITION DETERMINING METHOD

(71) Applicant: Honor Device Co., Ltd., Shenzhen (CN)

(72) Inventors: Youjun Zhang, Shenzhen (CN); Yuan Wu, Shenzhen (CN); Wujia Zhang, Shenzhen (CN); Yulei Wen, Shenzhen (CN); Jie Hu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 630 days.

(21) Appl. No.: 18/546,022

(22) PCT Filed: Dec. 26, 2022

(86) PCT No.: PCT/CN2022/142069
§ 371 (c)(1),
(2) Date: Aug. 10, 2023

(87) PCT Pub. No.: WO2023/151403
PCT Pub. Date: Aug. 17, 2023

(65) Prior Publication Data

US 2025/0038583 A1 Jan. 30, 2025

(30) Foreign Application Priority Data

Feb. 9, 2022 (CN) ......................... 202210121909.7

(51) Int. Cl.
*H02J 50/90* (2016.01)
*G01D 5/24* (2006.01)
(Continued)

(52) U.S. Cl.
CPC ................ *H02J 50/90* (2016.02); *G01D 5/24* (2013.01); *G06F 3/03545* (2013.01); *H02J 50/10* (2016.02)

(58) Field of Classification Search
CPC .. H02J 50/90; H02J 50/10; G01D 5/24; G06F 3/03545
See application file for complete search history.

(56) References Cited

U.S. PATENT DOCUMENTS 8,299,752 B2 10/2012 Sekita et al.
10,833,540 B2 * 11/2020 Chen .................. G01R 27/2688
(Continued)

FOREIGN PATENT DOCUMENTS

CN 101931250 A 12/2010
CN 108173359 A 6/2018
(Continued)

*Primary Examiner* — Daniel I Walsh
(74) *Attorney, Agent, or Firm* — Slater Matsil, LLP

(57) ABSTRACT

This application provides an electronic device and a stylus in-position determining method. The electronic device includes: an inverter circuit. When a Q value of the transmit coil is detected, the controller controls the resonant capacitor adjustment circuit to operate; the Q value detection circuit is configured to obtain a voltage signal representing a Q value; and the controller obtains the Q value based on the voltage signal, and when the Q value is greater than a preset threshold, determines that a stylus is attached to the electronic device. The resonant capacitor adjustment circuit participates in operation during Q value detection.

12 Claims, 6 Drawing Sheets

(51) Int. Cl.
*G06F 3/0354* (2013.01)
*H02J 50/10* (2016.01)

(56) References Cited

U.S. PATENT DOCUMENTS

| | | | | |
|---|---|---|---|---|
| 12,487,688 | B1 * | 12/2025 | Wang | G06F 3/03545 |
| 2005/0171714 | A1 * | 8/2005 | Ely | G06F 3/03545 702/150 |
| 2008/0150550 | A1 * | 6/2008 | Vos | G06F 3/046 324/655 |
| 2008/0150916 | A1 * | 6/2008 | Vos | G06F 3/046 340/572.1 |
| 2008/0150918 | A1 * | 6/2008 | Hagen | G06F 3/046 345/179 |
| 2014/0062967 | A1 * | 3/2014 | Lu | G06F 3/03545 200/600 |
| 2017/0269776 | A1 * | 9/2017 | Katsurahira | G06F 3/046 |
| 2019/0044362 | A1 | 2/2019 | Beyer et al. | |
| 2019/0267828 | A1 | 8/2019 | Goodchild et al. | |
| 2021/0175728 | A1 * | 6/2021 | Wang | G01R 27/2688 |
| 2021/0306799 | A1 * | 9/2021 | Kim | H04W 4/023 |
| 2022/0206593 | A1 * | 6/2022 | Park | G06F 3/03545 |
| 2022/0393515 | A1 | 12/2022 | Li | |
| 2023/0084747 | A1 | 3/2023 | Liu et al. | |
| 2023/0132565 | A1 * | 5/2023 | Yoon | G06F 3/03543 307/149 |
| 2023/0333673 | A1 * | 10/2023 | Kim | G06F 3/03545 |
| 2023/0393672 | A1 * | 12/2023 | Kim | G06F 3/03545 |
| 2024/0045523 | A1 * | 2/2024 | Kim | G06F 3/03545 |
| 2024/0168572 | A1 * | 5/2024 | Peng | G06F 3/0202 |
| 2024/0372404 | A1 * | 11/2024 | Wu | H02J 50/12 |
| 2025/0038583 | A1 * | 1/2025 | Zhang | G01D 5/24 |
| 2025/0055325 | A1 * | 2/2025 | Yu | H02J 50/80 |
| 2025/0088039 | A1 * | 3/2025 | Wang | H02J 50/12 |
| 2025/0147602 | A1 * | 5/2025 | Byun | G06F 3/046 |
| 2025/0264946 | A1 * | 8/2025 | Moon | G06F 3/046 |
| 2025/0370566 | A1 * | 12/2025 | Kim | G06F 3/03545 |
| 2026/0009715 | A1 * | 1/2026 | Mage | G01N 15/1429 |

FOREIGN PATENT DOCUMENTS

| | | | |
|---|---|---|---|
| CN | 110350670 | A | 10/2019 |
| CN | 111208357 | A | 5/2020 |
| CN | 111211598 | A | 5/2020 |
| CN | 210608650 | U | 5/2020 |
| CN | 111313569 | A | 6/2020 |
| CN | 210899713 | U | 6/2020 |
| CN | 111381107 | A | 7/2020 |
| CN | 111769655 | A | 10/2020 |
| CN | 111812408 | A | 10/2020 |
| CN | 111999772 | A | 11/2020 |
| CN | 113629894 | A | 11/2021 |
| CN | 113809835 | A | 12/2021 |
| WO | 2017168873 | A1 | 10/2017 |
| WO | 2020232823 | A1 | 11/2020 |
| WO | 2021210855 | A1 | 10/2021 |

* cited by examiner

ELECTRONIC DEVICE AND STYLUS IN-POSITION DETERMINING METHOD

CROSS-REFERENCE TO RELATED APPLICATIONS

This application is a National Stage of International Application No. PCT/CN2022/142069 filed on Dec. 26, 2022, which claims priority to Chinese Patent Application No. 202210121909.7 filed on Feb. 9, 2022, both of which are incorporated herein by references in their entireties.

TECHNICAL FIELD

This application relates to the field of terminal technologies, and in particular, to an electronic device and a stylus in-position determining method.

BACKGROUND

An electronic device is, for example, a tablet computer. A tablet computer, also referred to as a portable computer (Tablet Personal Computer, Tablet PC), is a computer that is small in size and easy to carry. For ease of use, currently, a tablet computer serving as a host may be externally connected to a keyboard. To be specific, the tablet computer may be operated and controlled through the keyboard.

For more convenience in actual use, currently, some tablet computers include a stylus. For example, the stylus may be attached to the tablet, and may be separated from the tablet during use. When the stylus is attached to the tablet, the tablet may wirelessly charge on the stylus. The tablet needs to detect an in-position status of the stylus and start wireless charging only when the stylus is in position.

In the conventional technology, a tablet computer is provided with an integral detection assembly including a Hall element, and the Hall element is used to detect whether a stylus is in position. However, the detection assembly usually includes parts with a relatively large volume, such as a soft board and a spring sheet, occupying a relatively large volume on a circuit board and causing relatively high costs.

SUMMARY

To resolve the foregoing problem, this application provides an electronic device and a stylus in-position determining method, to accurately detect whether a stylus is in position, and achieve low costs.

According to a first aspect, this application provides an electronic device, including: an inverter circuit, a resonance circuit, a controller, a resonant capacitor adjustment circuit, and a Q value detection circuit, where the resonance circuit includes a first capacitor and a transmit coil that are connected in series; an output terminal of the inverter circuit is connected to the resonance circuit; the resonant capacitor adjustment circuit is connected to the resonance circuit; the Q value detection circuit is connected to the resonance circuit; the resonant capacitor adjustment circuit includes at least a second capacitor; the controller is configured to: when a Q value of the transmit coil is detected, control the resonant capacitor adjustment circuit to operate, so that the first capacitor and the second capacitor are connected in parallel; the Q value detection circuit is configured to obtain a voltage signal representing a Q value, and send the voltage signal to the controller; and the controller is configured to obtain the Q value based on the voltage signal, and when the Q value is greater than a preset threshold, determine that a stylus is attached to the electronic device.

The resonant capacitor adjustment circuit is disposed in the electronic device provided in this application. During Q value detection, the controller controls the resonant capacitor adjustment circuit to participate in operation. This increases a capacitance value of a resonant capacitor, and slows down oscillation attenuation of the resonance circuit. In this way, the Q value can be accurately detected, and an accurate Q value can be used to determine whether the stylus is attached to the electronic device. In addition, a Hall device is simplified in the electronic device, and production costs of the electronic device can be reduced.

In a possible implementation, the controller may control a switch module in the resonant capacitor adjustment circuit, so that the resonant capacitor adjustment circuit participates in operation. A specific implementation form of the switch module is not limited in this application. The switch module may include one or more switches. For example, the resonant capacitor adjustment circuit further includes: a switch module, where a first terminal of the first capacitor is connected to a first output terminal of the inverter circuit, a second terminal of the first capacitor is connected to a first terminal of the transmit coil, and a second terminal of the transmit coil is connected to a second output terminal of the inverter circuit; the second capacitor and the switch module are connected in series and then connected between the second terminal of the first capacitor and a ground; and the controller is configured to control the switch module to close, so that the resonant capacitor adjustment circuit operates; and control the switch module to open, so that the resonant capacitor adjustment circuit exits operation.

In a possible implementation, during operation exit, to enable the resonant capacitor adjustment circuit 104 to completely exit operation with no current flowing through it, that is, to completely disconnect a current path to avoid power consumption, switching transistors provided in this embodiment of this application are implemented by using two PMOS transistors. To be specific, body diodes or anti-parallel diodes of the two PMOS transistors have opposite polarities. Specifically, the switch module includes a first PMOS transistor and a second PMOS transistor. The first PMOS transistor and the second PMOS transistor are connected in series, and a body diode of the first PMOS transistor and a body diode of the second PMOS transistor are reversed.

In a possible implementation, the Q value detection circuit includes: a direct current blocking circuit and a filter circuit; where a first terminal of the direct current blocking circuit is connected to the resonance circuit, a second terminal of the direct current blocking circuit is connected to a first terminal of the filter circuit, and a second terminal of the filter circuit is connected to the controller. The direct current blocking circuit may be implemented by a capacitor. The direct current blocking circuit is configured to block a direct current and allow an alternating current to flow through. The filter circuit is configured to filter out an unnecessary signal, so as to extract a voltage signal representing a Q value. For example, an output terminal of the filter circuit is connected to an I/O interface of the controller, and the interface may further have an analog-to-digital AD conversion function, that is, convert an analog voltage signal into a digital voltage signal, to facilitate processing by the controller. A larger value of a voltage signal on the I/O interface indicates a larger Q value. In a possible implementation, a second-order filter circuit may be used.

In a possible implementation, the Q value detection circuit further includes: a first diode and a voltage divider circuit, where the first diode is configured to prevent current reverse, that is, provide a reverse cutoff function. A first terminal of the voltage divider circuit is configured to be connected to a first power supply, a second terminal of the voltage divider circuit is grounded, and the filter circuit is connected to a third terminal of the voltage divider circuit; and the third terminal of the voltage divider circuit is connected to the second terminal of the direct current blocking circuit, the second terminal of the direct current blocking circuit is connected to an anode of the first diode, and a cathode of the first diode is connected to the first terminal of the filter circuit. The first power supply and the voltage divider circuit are configured to generate a boosted voltage, to offset voltage drop consumption of the first diode.

In a possible implementation, the following describes an implementation of a second-order filter circuit, and the filter circuit includes: a first resistor, a second resistor, a third capacitor, a third resistor, and a fourth capacitor; where a first terminal of the first resistor is connected to the cathode of the first diode, the anode of the first diode is connected to the second terminal of the direct current blocking circuit, a second terminal of the first resistor is connected to a first terminal of the second resistor, and a second terminal of the second resistor is grounded; and a first terminal of the third resistor is connected to the second terminal of the first resistor, a first terminal of the third capacitor is connected to the first terminal of the third resistor, a second terminal of the third resistor is connected to an output terminal of the filter circuit, a second terminal of the third capacitor is grounded, a first terminal of the fourth capacitor is connected to the output terminal of the filter circuit, and a second terminal of the fourth capacitor is grounded.

In a possible implementation, the following describes an implementation of the voltage divider circuit. To be specific, the voltage divider circuit is implemented by a voltage divider resistor. For example, the voltage divider circuit includes: a fifth resistor and a sixth resistor; where a first terminal of the fifth resistor is connected to the first terminal of the voltage divider circuit, a second terminal of the fifth resistor is connected to the third terminal of the voltage divider circuit, the second terminal of the fifth resistor is connected to a first terminal of the sixth resistor, and a second terminal of the sixth resistor is connected to the second terminal of the voltage divider circuit.

In a possible implementation, the electronic device further includes: a pulse source circuit, where the pulse source circuit is configured to generate an oscillation source for Q value detection. The pulse source circuit includes a fourth resistor and a second diode; and a first terminal of the fourth resistor is connected to a second power supply, a second terminal of the fourth resistor is connected to an anode of the second diode, and a cathode of the second diode is connected to the resonance circuit.

In a possible implementation, the controller is further configured to: after determining that the stylus is attached to the electronic device, control the resonant capacitor adjustment circuit to exist operation and the transmit coil to wirelessly charge the stylus.

In a possible implementation, a magnetic attraction device is disposed at a top end of the electronic device, and the magnetic attraction device is configured to attract the stylus.

Based on the electronic device provided above, this application further provides a stylus in-position determining method, applied to the electronic device. The electronic device includes: an inverter circuit, a resonance circuit, a resonant capacitor adjustment circuit, and a Q value detection circuit; where the resonance circuit includes a first capacitor and a transmit coil that are connected in series; an output terminal of the inverter circuit is connected to the resonance circuit; the resonant capacitor adjustment circuit is connected to the resonance circuit; the Q value detection circuit is connected to the resonance circuit; the resonant capacitor adjustment circuit includes at least a second capacitor; and the Q value detection circuit is configured to obtain a voltage signal representing a Q value; and the method includes: when a Q value of the transmit coil is detected, controlling the resonant capacitor adjustment circuit to operate, so that the first capacitor and the second capacitor are connected in parallel; and when the Q value is greater than a preset threshold, determining that the stylus is attached to the electronic device.

In a possible implementation, the method further includes: after determining that the stylus is attached to the electronic device, controlling the resonant capacitor adjustment circuit to exist operation and controlling the transmit coil to wirelessly charge the stylus.

This application has at least the following advantages:

The electronic device provided in this application may be, for example, a tablet computer. The tablet computer may wirelessly charge a stylus. A transmit coil for wireless charging is disposed inside the tablet computer, and the transmit coil may be located in a metal frame. The metal frame affects a Q value of the transmit coil, causing inaccurate Q value detection. In this application, to accurately detect the Q value, the resonance capacitor adjustment circuit is added to increase a discrimination degree of the Q value. During Q value detection, the controller controls the resonance capacitor adjustment circuit to operate. This increases a capacitance value of a capacitor that participates in oscillation, and reduces a speed of oscillation attenuation. In this way, the Q value can be accurately detected. Therefore, an accurate Q value is used to determine whether the stylus is attached to the electronic device. The electronic device can wirelessly charge the stylus only when the stylus is attached to the electronic device. In the electronic device provided in this application, no Hall device needs to be disposed to detect whether the stylus is attached, that is, a conventional Hall device is omitted. Whether the stylus is in position can be determined simply by detecting a Q value, and this can reduce production costs of the electronic device.

DETAILED DESCRIPTION OF ILLUSTRATIVE EMBODIMENTS

To enable those skilled in the art to understand the solutions of this application more clearly, application scenarios of the technical solutions of this application are first described below.

Figure 1A:
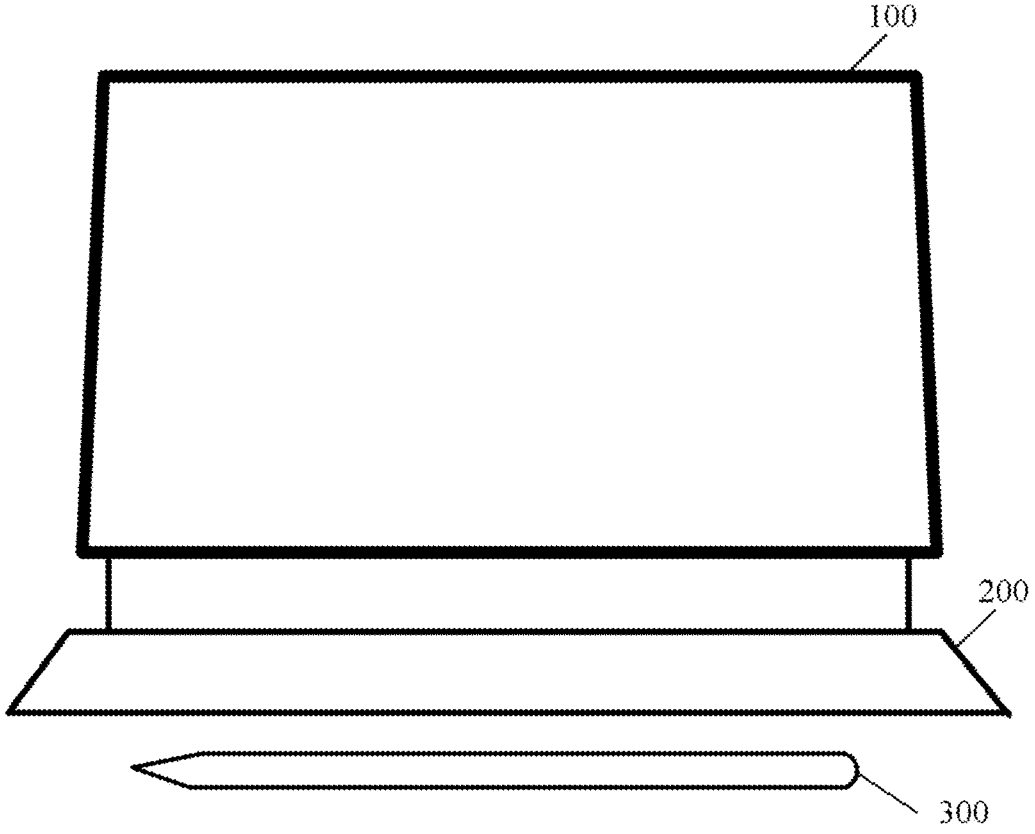
FIG. 1A is a schematic diagram of a connection between a host of a tablet computer and a keyboard.

FIG. 1A is a schematic diagram of a connection between a host of a tablet computer and a keyboard.

For ease of use, currently, many tablet computers are equipped with a keyboard 200, and the keyboard is directly connected to a host 100 of the tablet computer by using three pins. The three pins include a data pin, a power pin, and a GND pin. Because the host 100 needs to use the data pin in the three pins to detect whether the keyboard is connected, a level jump of the data pin is usually detected to determine whether the keyboard is connected. For example, the level changes from high to low, that is, is pulled down.

In addition, because the host 100 has a touch function and a handwriting function, the tablet computer may further be provided with a stylus 300. An implementation form of the stylus 300 is not specifically limited in this embodiment of this application. In a possible implementation, the stylus 300 may be attached to a top end of the host 100, for example, a magnet device is disposed at the top end of the host 100, and an attracting magnet is disposed in a corresponding position on the stylus 300. The magnet device and the attracting magnet are more securely attached. In this case, the stylus 300 may be attached to the magnet device disposed at the top end of the host 100. When in use, the stylus 300 may be removed from the host 100. When not in use, the stylus 300 may be attached to the top end of the host 100. In addition, the host 100 may further wirelessly charge the stylus 300. To be specific, when the stylus 300 is attached to the top end of the host 100, a transmit coil disposed on the host 100 may wirelessly charge the stylus 300. A receive coil is disposed inside the stylus 300.

The host 100 and the keyboard 200 in FIG. 1A are merely examples, and specific product forms may be different.

Figure 1B:
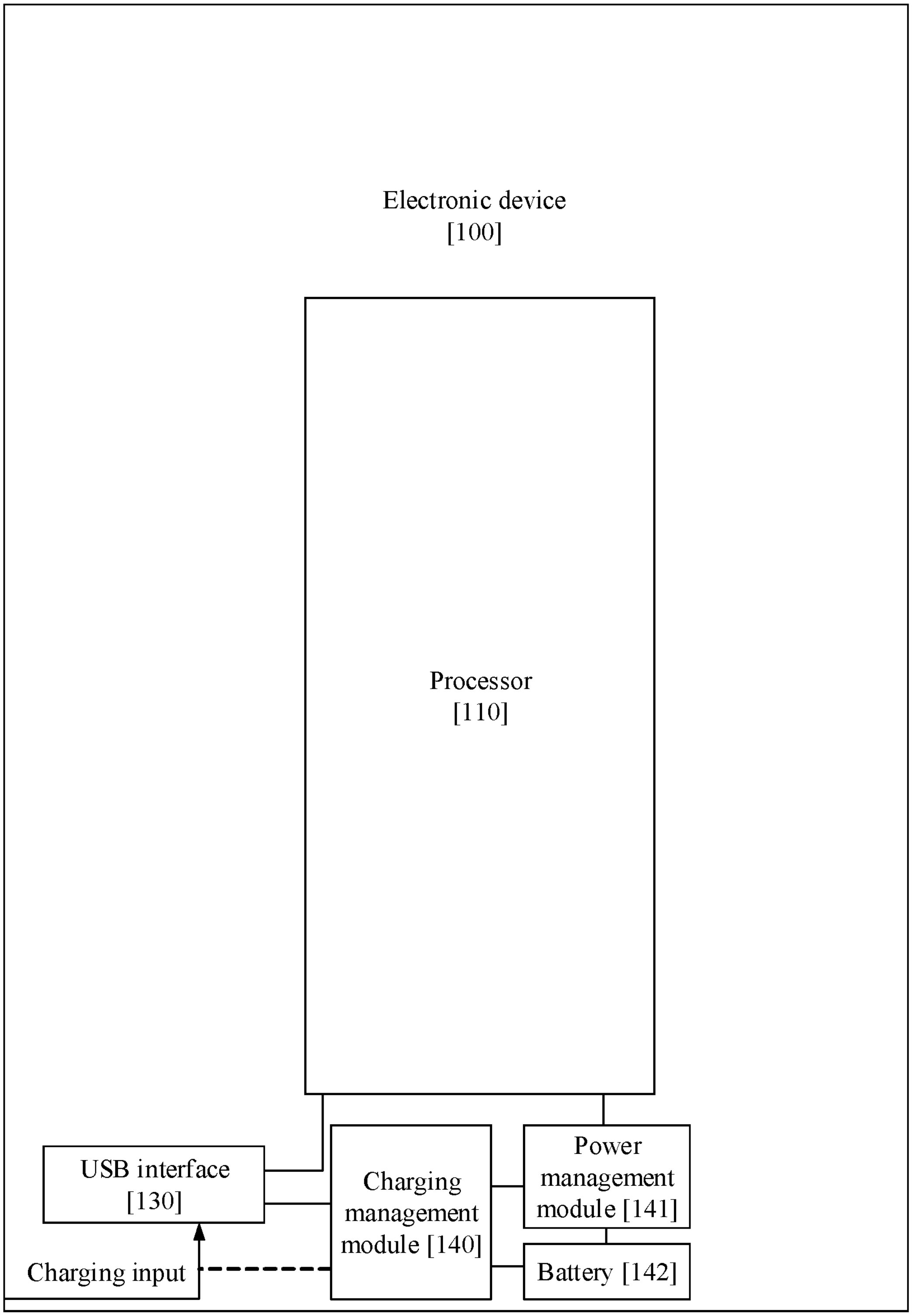
FIG. 1B is a diagram of an architecture of an electronic device.

FIG. 1B is a diagram of an architecture of an electronic device.

The electronic device 100 may include a processor 110, a charging management module 140, a power management module 141, a battery 142, and the like.

It may be understood that the structure illustrated in this embodiment of the present invention does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may generate an operation control signal based on instruction operation code and a timing signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 140 is configured to receive a charging input from a charger. The charger may be a wireless charger or may be a wired charger. In some embodiments of wired charging, the charging management module 140 may receive a charging input of a wired charger by using a USB interface 130. In some embodiments of wireless charging, the charging management module 140 may receive a wireless charging input through a wireless charging coil of the electronic device 100. The charging management module 140 may supply power for the electronic device by using the power management module 141 while charging the battery 142.

The power management module 141 is configured to be connected to the battery 142, the charging management module 140, and the processor 110. The power management module 141 receives an input of the battery 142 and/or the charging management module 140, and supplies power to the processor 110, an internal memory 121, a display 194, a camera 193, a wireless communication module 160, and the like. The power management module 141 may also be configured to monitor parameters such as a battery capacity, a quantity of battery cycles, and a battery health status (power leakage and impedance). In some other embodiments, the power management module 141 may alternatively be disposed in the processor 110. In some other embodiments, the power management module 141 and the charging management module 140 may further be configured in a same device.

To resolve the foregoing technical problem, an embodiment of this application provides an electronic device, including a host and a keyboard. The host can accurately detect whether the keyboard is connected, and can recover a level state of a detection pin, that is, recover a level state of a data pin, without affecting normal data communication between the keyboard and the host.

To make those skilled in the art better understand technical solutions provided in the embodiments of this application, a concept of a Q value is first described.

For wireless charging, a transmit end needs to have a transmit coil, a receive end needs to have a receive coil, and electromagnetic induction is performed between the transmit coil and the receive coil to transmit energy. In this embodiment of this application, a tablet computer is used as an example of the electronic device. The tablet computer is used as a transmit end, and a stylus is used as a receive end.

The Q value is a main parameter used to measure an inductor device, and is a ratio of inductive reactance presented by an inductor to equivalent loss resistance of the inductor when the inductor operates at an alternating voltage of a frequency. A higher Q value of the inductor indicates a smaller loss and higher efficiency.

For a definition of the Q value, refer to the following formula (1):

$$Q = \frac{2\pi f \times L_1}{R_{tx\ acr}} \quad (1)$$

L1 is an inductance value of the transmit coil, Rtx acr is an alternating current impedance of the transmit coil, and f is a resonance frequency of a resonance circuit for wireless charging.

Because the transmit coil is disposed in the tablet computer, when the stylus approaches the tablet computer, a size of inductance of the transmit coil is affected, and equivalent resistance of the transmit coil is also changed. Therefore, the Q value is affected, and the host can determine, by simply detecting the Q value of the transmit coil, whether the stylus is attached. However, currently, the transmit coil of the tablet computer is placed in a metal frame. When the Q value is directly detected, oscillation in Q value detection is rapidly attenuated. Therefore, the detected Q value is inaccurate. Whether the stylus is attached cannot be accurately determined by using the Q value.

Device Embodiment

To resolve the foregoing technical problem, a resonant capacitor adjustment circuit is disposed in the electronic device provided in this embodiment of this application. During Q value detection, the resonant capacitor adjustment circuit participates in operation, so that oscillation attenuation of the resonance circuit can be slowed down, to accurately detect the Q value and further accurately determine whether the stylus is attached.

Figure 2:
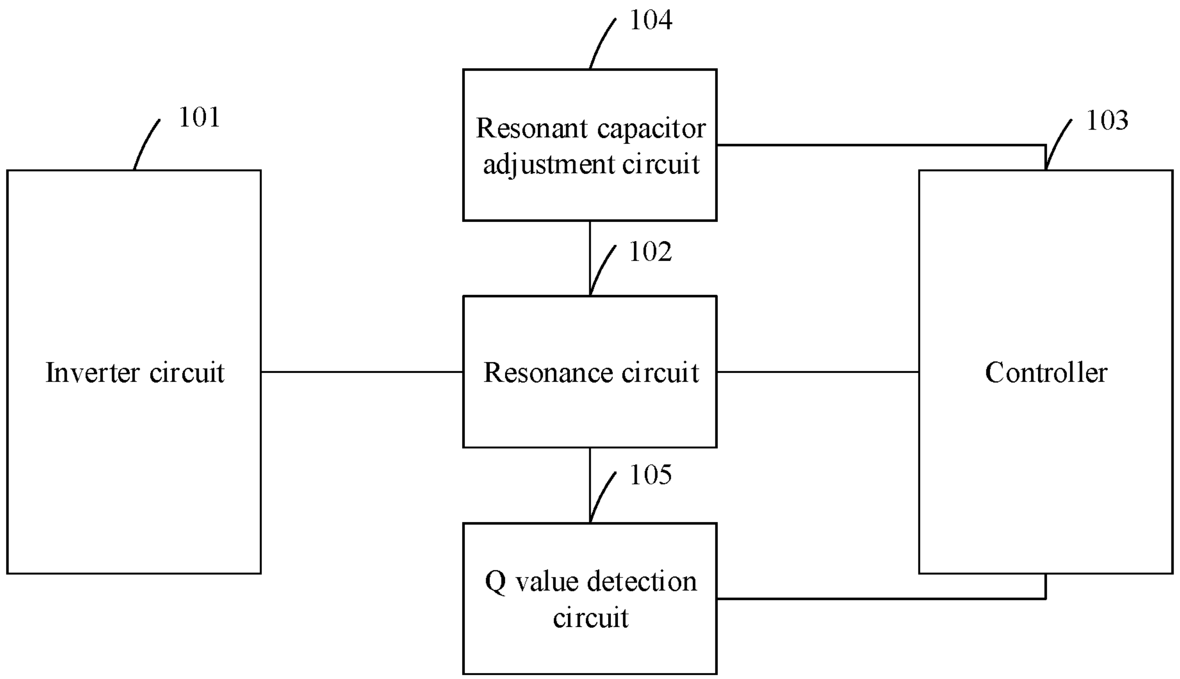
FIG. 2 is a schematic diagram of an electronic device according to an embodiment of this application.

FIG. 2 is a schematic diagram of an electronic device according to an embodiment of this application.

The electronic device provided in this embodiment includes: an inverter circuit 101, a resonance circuit 102, a controller 103, a resonant capacitor adjustment circuit 104, and a Q value detection circuit 105.

Because the electronic device charges a stylus in a wireless charging manner, the inverter circuit 101 needs to invert a direct current into an alternating current, so that energy is transmitted in a form of an alternating magnetic field by using a transmit coil of the resonance circuit 102. In this way, the stylus is wirelessly charged. A specific implementation form of the inverter circuit 101 is not specifically limited in this embodiment of this application. For example, the inverter circuit 101 may be a full-bridge inverter circuit, or may be a half-bridge inverter circuit. A specific implementation form of the resonance circuit 102 is not specifically limited in this embodiment of this application, either. In this embodiment of this application, an example in which the resonance circuit 102 includes a first capacitor and a transmit coil that are connected in series is used for description. In addition, the resonance circuit 102 may further include another circuit.

An output terminal of the inverter circuit 101 is connected to the resonance circuit 102. The controller 103 obtains a Q value of the transmit coil by testing attenuated oscillation of the LC circuit. When a capacitance value of a capacitor that participates in attenuated oscillation is small, oscillation attenuation is fast. When the attenuation is excessively fast, Q value detection is inaccurate. Therefore, in this embodiment of this application, to increase a discrimination degree of the Q value, the value of the capacitor that participates in the oscillation is increased during Q value detection, to reduce a speed of oscillation attenuation, so as to accurately detect the Q value. Specifically, the resonant capacitor adjustment circuit 104 is added in the technical solution provided in this embodiment of this application. The resonant capacitor adjustment circuit 104 is connected to the resonance circuit 102. The Q value detection circuit is connected to the resonance circuit 102.

The resonant capacitor adjustment circuit 104 includes at least a second capacitor.

The controller 103 is configured to: when the Q value of the transmit coil is detected, control the resonant capacitor adjustment circuit 102 to operate, so that the first capacitor and the second capacitor are connected in parallel. In other words, the second capacitor is added, so that the second capacitor and the first capacitor are connected in parallel. This increases a capacitance value of a whole capacitor, and reduces a speed of oscillation attenuation.

The Q value detection circuit 105 is configured to detect the Q value of the transmit coil, and send the Q value to the controller 103.

The controller 103 is configured to: when the Q value is greater than a preset threshold, determine that the stylus is attached to the electronic device. When the stylus approaches, a value of inductance of the transmit coil is affected, and thus the Q value of the transmit coil is increased. Therefore, when it is determined that the Q value reaches the preset threshold for attachment of the stylus, it is determined that the stylus is attached, and the controller 103 stops stylus attachment determining. The controller 103 may send a digital ping to the stylus, to establish communication with the stylus. After the communication succeeds, the electronic device may wirelessly charge the stylus.

The electronic device provided in this application may be, for example, a tablet computer. The tablet computer may wirelessly charge a stylus. A transmit coil for wireless charging is disposed inside the tablet computer, and the transmit coil may be located in a metal frame. The metal frame affects a Q value of the transmit coil, causing inaccurate Q value detection. In this application, to accurately detect the Q value, the resonance capacitor adjustment circuit is added to increase a discrimination degree of the Q value. During Q value detection, the controller controls the resonance capacitor adjustment circuit to operate. This increases a capacitance value of a capacitor that participates in oscillation, and reduces a speed of oscillation attenuation. In this way, the Q value can be accurately detected. Therefore, an accurate Q value is used to determine whether the stylus is attached to the electronic device. The electronic device can wirelessly charge the stylus only when the stylus is attached to the electronic device. In the electronic device provided in this application, no Hall device needs to be disposed to detect whether the stylus is attached, that is, a conventional Hall device is omitted. Whether the stylus is in position can be determined simply by detecting a Q value, and this can reduce production costs of the electronic device.

It should be understood that, after the stylus is removed, the controller 103 starts to periodically determine whether the stylus is attached. To be specific, the controller 103 may periodically detect the Q value of the transmit coil, and determine, by using the Q value, whether the stylus is attached.

The following describes a specific circuit for implementing Q value detection by the electronic device with reference to the accompanying drawings.

Figure 3:
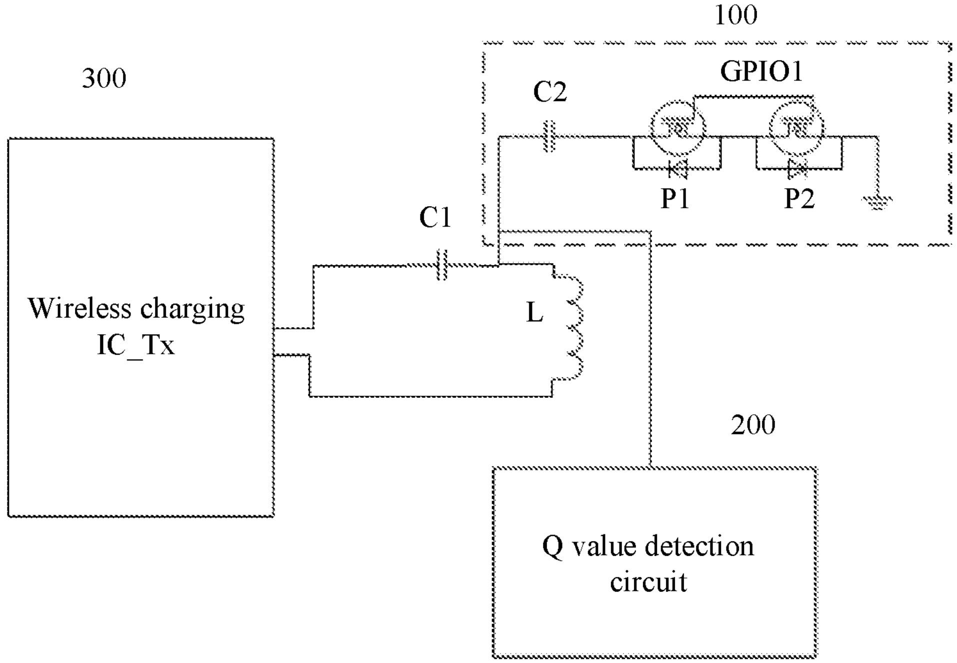
FIG. 3 is a circuit diagram of an electronic device according to an embodiment of this application.

FIG. 3 is a circuit diagram of an electronic device according to an embodiment of this application.

This embodiment provides a specific implementation of a resonant capacitor adjustment circuit 100. In addition to a second capacitor C2, the resonant capacitor adjustment circuit 100 in this embodiment further includes: a switch module.

The following first describes a specific structure of the resonance circuit. In this embodiment, an example in which the resonance circuit includes an inductor and a capacitor that are connected in series is used for description.

A first terminal of a first capacitor C1 is connected to a first output terminal of the inverter circuit. In other words, wireless charging IC_Tx 300 in FIG. 3 includes the inverter circuit.

A second terminal of the first capacitor C1 is connected to a first terminal of a transmit coil L, and a second terminal of the transmit coil L is connected to a second output terminal of the inverter circuit.

The second capacitor C2 and the switch module are connected in series and then connected between the second terminal of the first capacitor C1 and a ground.

The controller is configured to control the switch module to close, so that the resonant capacitor adjustment circuit 100 operates; and control the switch module to open, so that the resonant capacitor adjustment circuit 100 exits operation.

A specific implementation form of the switch module is not specifically limited in this embodiment of this application. The switch module may include any type of semiconductor switch device. For example, an example in which the switch module includes a PMOS transistor is used for description. Alternatively, the switch module may include another type of switching transistor. Specifically, the controller may control a switch status of the switch module in the resonant capacitor adjustment circuit 100 to control whether the resonant capacitor adjustment circuit 100 operates. For example, when the switch module is turned on, the resonant capacitor adjustment circuit 100 participates in operation. When the switch module is turned off, the resonant capacitor regulation circuit 100 exits operation.

During operation exit, to enable the resonant capacitor adjustment circuit 100 to completely exit operation with no current flowing through it, that is, to completely disconnect a current path to avoid electric energy consumption, switching transistors provided in this embodiment of this application are implemented by using two vertically connected PMOS transistors. To be specific, body diodes or anti-parallel diodes of the two PMOS transistors have opposite polarities.

The switch module includes a first PMOS transistor P1 and a second PMOS transistor P2.

The first PMOS transistor P1 and the second PMOS transistor P2 are connected in series, and a body diode of the first PMOS transistor P1 and a body diode of the second PMOS transistor P2 are reversed. It can be seen from the figure that, an anode of the body diode of the first PMOS transistor P1 is connected to an anode of the body diode of P2. When a current flows through the body diode of the first PMOS transistor P1, the current does not flow through the body diode of P2. Likewise, when a current flows through the body diode of the second PMOS transistor P2, the current does not flow through the body diode of the first PMOS transistor P1. Therefore, regardless of whether a direction of the current is from the first PMOS transistor P1 to the second PMOS transistor P2 or from the second PMOS transistor P2 to the first PMOS transistor P1, when the first PMOS transistor P1 and the second PMOS transistor P2 are turned off, no current path is formed, and the switching transistors are completely turned off. That is, when the resonant capacitor adjustment circuit 100 exits operation, no current flows through the branch.

Gates of the first PMOS transistor P1 and the second PMOS transistor P2 may be controlled by the controller, for example, may be controlled by a GPIO1 interface of the controller, so as to control drive signals of the gates of the first PMOS transistor P1 and the second PMOS transistor P2, and implement turn-on and turn-off of the first PMOS transistor P1 and the second PMOS transistor P2. It should be understood that, the first PMOS transistor P1 and the second PMOS transistor P2 perform synchronous actions, that is, are simultaneously turned off or turned on. In a possible implementation, the controller may be implemented by the wireless charging IC_Tx.

With reference to the accompanying drawings, the following describes in detail an operating principle of the resonant capacitor adjustment circuit participating in operation.

Figure 4:
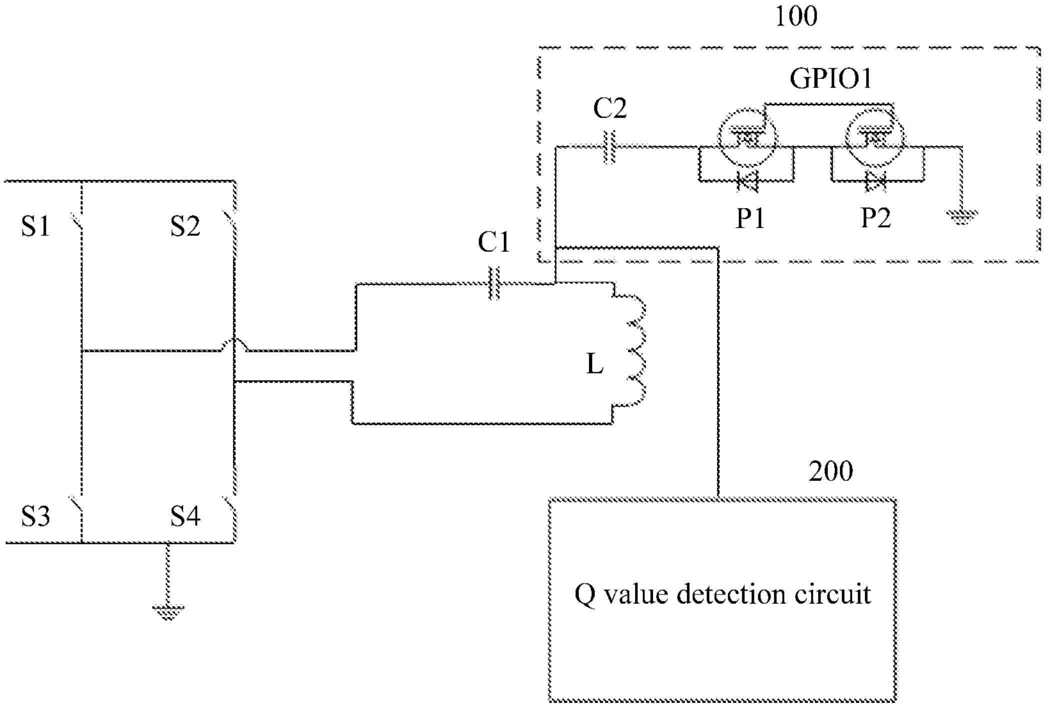
FIG. 4 is a circuit diagram of another electronic device according to an embodiment of this application.

FIG. 4 is a circuit diagram of another electronic device according to an embodiment of this application.

Because the resonance circuit is connected to the output terminals of the inverter circuit, and the resonant capacitor adjustment circuit 100 is connected to the resonance circuit, the following analyzes, with reference to the inverter circuit, a manner of implementing parallel connection between the first capacitor C1 and the second capacitor C2.

In this embodiment, that the inverter circuit is a full-bridge inverter circuit is used for description. The inverter circuit includes two bridge arms. A first bridge arm includes a switch S1 and a switch S3 that are connected in series, and a second bridge arm includes a switch S2 and a switch S4 that are connected in series. The first terminal of the first capacitor C1 is connected to the first output terminal of the inverter circuit, that is, the first capacitor C1 is connected between S1 and S3, and a second terminal of L is connected to the second output terminal of the inverter circuit, that is, the second terminal of L is connected between the switch S2 and the switch S4.

When switching transistors in lower bridge arms of the two bridge arms of the inverter circuit are turned on, the first capacitor C1 and the second capacitor C2 can be connected in parallel, that is, a switching transistor S3 in the lower bridge arm of the first bridge arm is turned on, and a switching transistor S4 in the lower bridge arm of the second bridge arm is turned on. Because a negative input terminal of the inverter circuit is grounded, the first terminal of the first capacitor C1 is grounded by turning on S3, and the second terminal of L is grounded by turning on S4. When the controller controls both P1 and P2 to be turned on, a second terminal of the second capacitor C2 is grounded, and a first terminal of the second capacitor C2 is connected to the second terminal of C1, so that the first capacitor C1 and the second capacitor C2 are connected in parallel.

Figure 5:
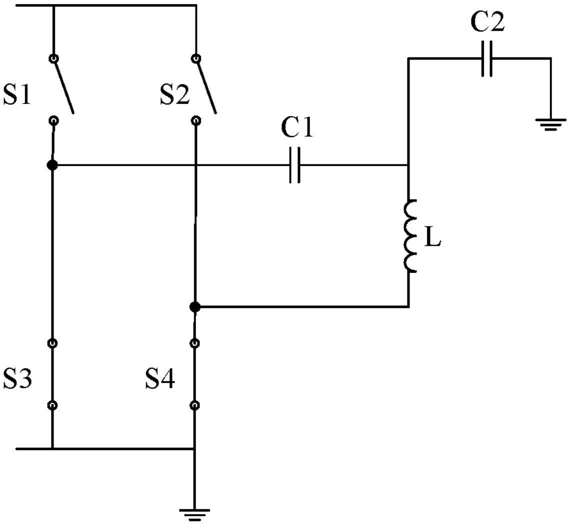
FIG. 5 is an equivalent circuit diagram corresponding to FIG. 4 according to an embodiment of this application.

To more clearly understand the parallel connection solution of the first capacitor C1 and the second capacitor C2, refer to FIG. 5 for details. FIG. 5 is an equivalent circuit diagram corresponding to FIG. 4 according to an embodiment of this application.

It can be seen from FIG. 5 that, the second terminal of the first capacitor C1 and the first terminal of the second capacitor C2 are connected, the first terminal of the first capacitor C1 is grounded, and the second terminal of the second capacitor C2 is grounded. This is equivalent to the following: The first terminal of the first capacitor C1 and the second terminal of C2 are connected, so that the first capacitor C1 and the second capacitor C2 are connected in parallel, that is, C1, C2, and L form a resonant cavity together with the lower bridge arms of the inverter circuit.

When the first capacitor C1 and the second capacitor C2 are connected in parallel, a capacitance value of a total capacitor is increased, thereby increasing an oscillation period. In this way, attenuation is slowed down, a discrimination degree of a Q value is increased, and the Q value is accurately detected, so that whether a stylus is attached can be accurately determined based on an accurate Q value.

The following describes an implementation of the Q value detection circuit provided in this embodiment of this application.

Figure 6:
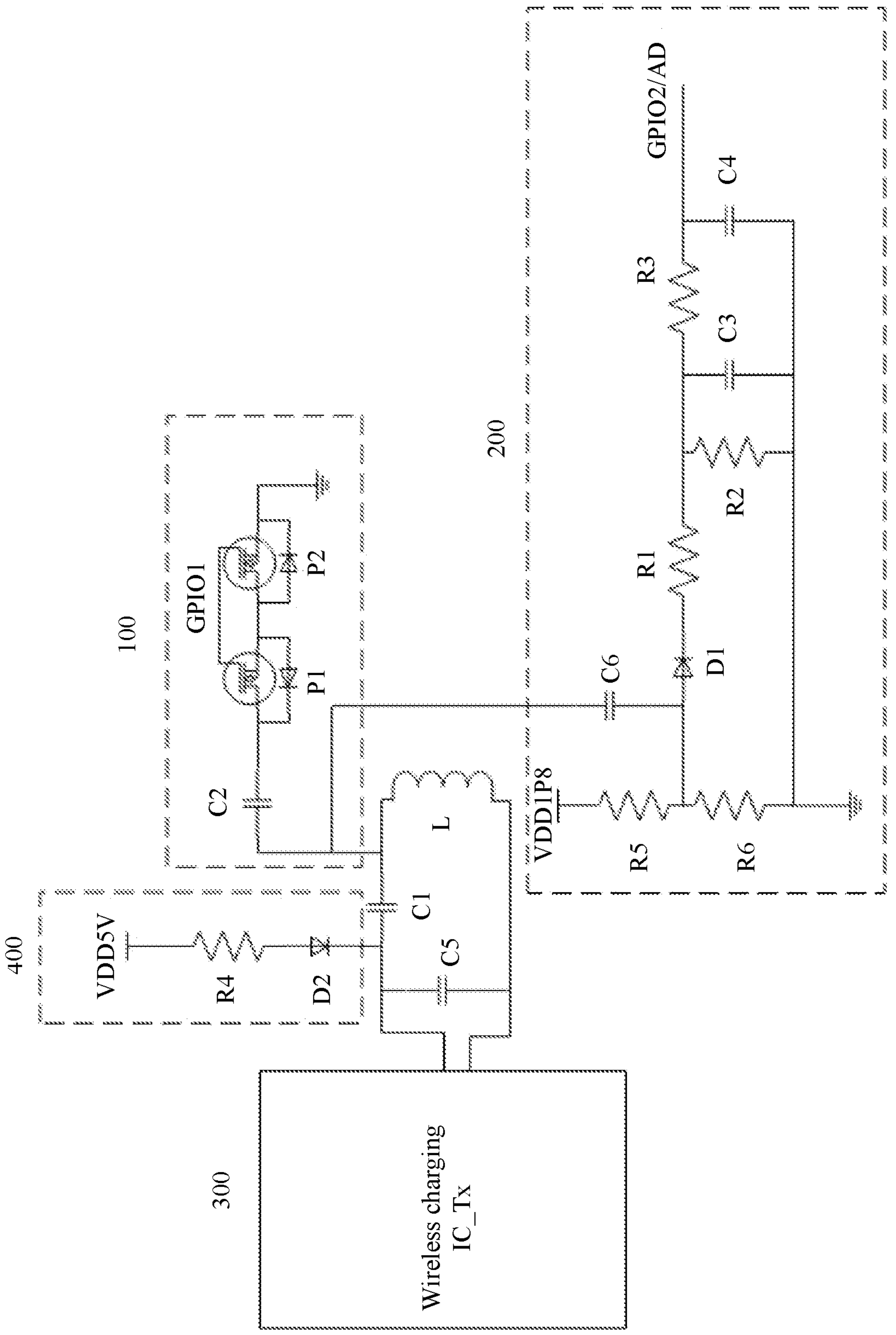
FIG. 6 is a circuit diagram of still another electronic device according to an embodiment of this application.

FIG. 6 is a circuit diagram of still another electronic device according to an embodiment of this application.

The Q value detection circuit in the electronic device provided in this embodiment includes: a direct current blocking circuit and a filter circuit.

A first terminal of the direct current blocking circuit is connected to the resonance circuit, a second terminal of the direct current blocking circuit is connected to a first terminal of the filter circuit, and a second terminal of the filter circuit is connected to the controller. As shown in FIG. 6, the direct current blocking circuit is implemented by using a sixth capacitor C6. To be specific, a first terminal of C6 is connected to the first terminal of the second capacitor C2, and a second terminal of the sixth capacitor C6 is connected to an input terminal of the filter circuit. In this embodiment, an example in which the filter circuit is a second-order filter circuit is used for description.

In addition, in the electronic device provided in this embodiment, the Q value detection circuit further includes: a first diode D1 and a voltage divider circuit. The voltage divider circuit includes a fifth resistor R5 and a sixth resistor R6 that are connected in series. A first terminal of the fifth resistor R5 is connected to a first terminal of the voltage divider circuit, a second terminal of the fifth resistor R5 is connected to a third terminal of the voltage divider circuit, the second terminal of the fifth resistor R5 is connected to a first terminal of the sixth resistor R6, and a second terminal of the sixth resistor R6 is connected to a second terminal of the voltage divider circuit. The first diode D1 is configured to prevent current reverse, that is, provide a reverse cutoff function.

The first terminal of the voltage divider circuit is configured to be connected to a first power supply VDD1P8. In this embodiment, an example in which a voltage of the first power supply is 1.8 V is used for description. The second terminal of the voltage divider circuit is grounded, and the filter circuit is connected to the third terminal of the voltage divider circuit. The third terminal of the voltage divider circuit is connected to the second terminal of the direct current blocking circuit, the second terminal of the direct current blocking circuit is connected to an anode of the first diode D1, and a cathode of the first diode D1 is connected to the first terminal of the filter circuit. The direct current blocking circuit includes the sixth capacitor C6, that is, the capacitor may be configured to block a direct current and allow an alternating current to flow through. The first power supply and the voltage divider circuit are configured to generate a boosted voltage, to offset voltage drop consumption of the first diode D1.

As shown in FIG. 6, the filter circuit includes: a first resistor R1, a second resistor R2, a third capacitor C3, a third resistor R3, and a fourth capacitor C4.

A first terminal of the first resistor R1 is connected to the cathode of the first diode D1, the anode of the first diode D1 is connected to the second terminal of the direct current blocking circuit, a second terminal of the first resistor R1 is connected to a first terminal of the second resistor R2, and a second terminal of the second resistor R2 is grounded. A first terminal of the third resistor R3 is connected to the second terminal of the first resistor R1, a first terminal of the third capacitor C3 is connected to the first terminal of the third resistor R3, and a second terminal of the third resistor R3 is connected to an output terminal of the filter circuit.

A second terminal of the third capacitor C3 is grounded, a first terminal of the fourth capacitor C4 is connected to the output terminal of the filter circuit, and a second terminal of the fourth capacitor C4 is grounded.

In this embodiment, the filter circuit is configured to filter out an interfering signal, so as to extract a voltage signal representing a Q value. For example, the output terminal of the filter circuit is connected to a GPIO2 interface of the controller, and the interface may further have an analog-to-digital AD conversion function, that is, convert an analog voltage signal into a digital voltage signal, to facilitate processing by the controller. A larger value of a voltage signal of the GPIO2 interface indicates a larger Q value.

In addition, the electronic device provided in this embodiment of this application further includes: a pulse source circuit. The pulse source circuit includes a fourth resistor R4 and a second diode D2. The pulse source circuit is configured to generate an oscillation source for Q value detection.

A first terminal of the fourth resistor R4 is connected to a second power supply VDD5V, a second terminal of the fourth resistor R4 is connected to an anode of the second diode D2, and a cathode of the second diode D2 is connected to the resonance circuit.

In the electronic device provided in this embodiment, in addition to the first capacitor C1 and the transmit coil L, the resonance circuit further includes a fifth capacitor C5. The fifth capacitor C5 is connected in parallel to the first output terminal and the second output terminal of the inverter circuit.

In addition, a magnetic attraction device is disposed at a top end of the electronic device provided in this embodiment of this application, and the magnetic attraction device is configured to attract the stylus, that is, the stylus is disposed in a top attraction manner.

Method Embodiment

Based on the electronic device provided in the foregoing embodiment, an embodiment of this application further provides a stylus in-position determining method. The method is described in detail below with reference to the accompanying drawings.

Figure 7:
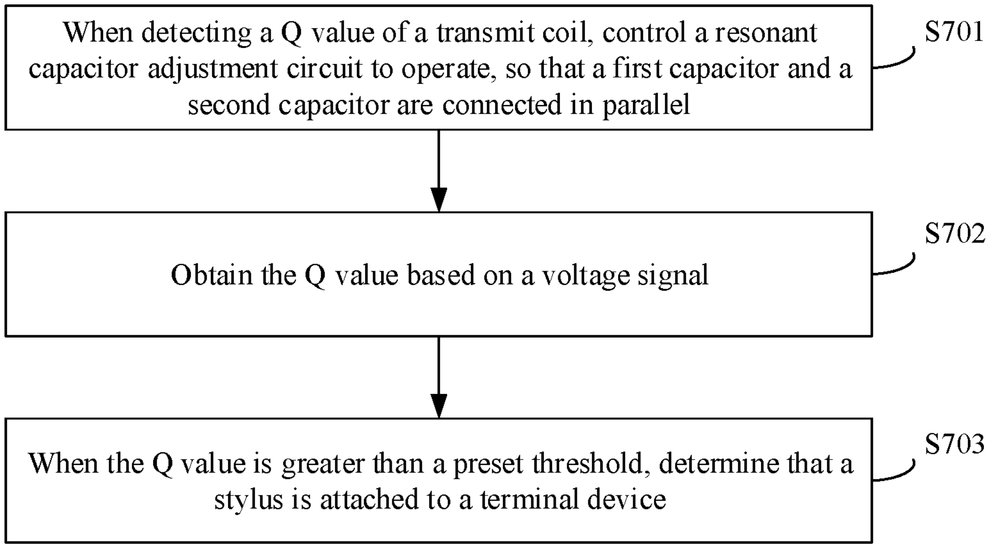
FIG. 7 is a flowchart of a stylus in-position determining method according to an embodiment of this application.

FIG. 7 is a flowchart of a stylus in-position determining method according to an embodiment of this application.

The stylus in-position determining method provided in this embodiment is applied to an electronic device, and the electronic device includes: an inverter circuit, a resonance circuit, a resonant capacitor adjustment circuit, and a Q value detection circuit; where the resonance circuit includes a first capacitor and a transmit coil that are connected in series; an output terminal of the inverter circuit is connected to the resonance circuit; the resonant capacitor adjustment circuit is connected to the resonance circuit; the Q value detection circuit is connected to the resonance circuit; the resonant capacitor adjustment circuit includes at least a second capacitor; and the Q value detection circuit is configured to obtain a voltage signal representing a Q value.

The method includes the following steps.

S701: When detecting a Q value of the transmit coil, control the resonant capacitor adjustment circuit to operate, so that the first capacitor and the second capacitor are connected in parallel.

The second capacitor is added in the electronic device, so that the second capacitor and the first capacitor are connected in parallel. This increases a capacitance value of a whole capacitor, and reduces a speed of oscillation attenuation.

S702: Obtain the Q value based on the voltage signal.

Because the Q value detection circuit is connected to the resonance circuit, and is also connected to the second capacitor, the voltage signal representing the Q value may be detected.

S703: When the Q value is greater than a preset threshold, determine that a stylus is attached to the electronic device.

When the stylus approaches, a value of inductance of the transmit coil is affected, and thus the Q value of the transmit coil is increased. Therefore, when it is determined that the Q value reaches the preset threshold for attachment of the stylus, it is determined that the stylus is attached, and the electronic device stops stylus attachment determining. When it is determined that the stylus is in position, the electronic device may send a digital ping to the stylus, to establish communication with the stylus. After the communication succeeds, the electronic device may wirelessly charge the stylus.

According to the method provided in this embodiment, because the transmit coil for wireless charging is disposed inside the electronic device, and the transmit coil may be located in a metal frame, the metal frame affects the Q value of the transmit coil, causing inaccurate Q value detection. In this application, to accurately detect the Q value and increase a discrimination degree of the Q value, during Q value detection, the resonant capacitor adjustment circuit is controlled to operate This increases a capacitance value of a capacitor that participates in oscillation, and reduces a speed of oscillation attenuation. In this way, the Q value can be accurately detected, and the Q value can be used to determine whether the stylus is attached. The stylus can be wirelessly charged only when the stylus is attached. In the electronic device, no Hall device needs to be disposed, that is, a conventional Hall device is omitted. Stylus in-position detection can be implemented simply by detecting a Q value, and this can reduce production costs.

In addition, the method provided in this embodiment further includes: after determining that the stylus is attached to the electronic device, controlling the resonant capacitor adjustment circuit to exit operation and controlling the transmit coil to wirelessly charge the stylus.

It should be understood that, in this application, "at least one" refers to one or more, and "a plurality of" refers to two or more. The term "and/or" is used to describe an association relationship between associated objects, and indicates that there may be three relationships. For example, "A and/or B" may indicate that only A exists, only B exists, and both A and B exist, where A and B may be singular or plural. The character "/" generally indicates an "or" relationship between associated objects.

"At least one of the following" or a similar expression thereof refers to any combination of these items, including one item or any combination of a plurality of items. For example, at least one of a, b, or c may represent a, b, c, "a and b", "a and c", "b and c", or "a, b, and c", where a, b, and c may be singular or plural.

In conclusion, the foregoing embodiments are merely used to describe the technical solutions of this application, but are not intended to constitute limitations. Although this application is described in detail with reference to the foregoing embodiments, those of ordinary skill in the art should understand that: they may still make modifications to the technical solutions described in the foregoing embodiments or make equivalent replacements to some technical features thereof, without departing from the spirit and scope of the technical solutions of the embodiments of this application.

What is claimed is:

1. An electronic device, comprising: an inverter circuit, a resonance circuit, a controller, a resonant capacitor adjustment circuit, and a Q value detection circuit;

wherein the resonance circuit comprises a first capacitor and a transmit coil that are connected in series; and an output terminal of the inverter circuit is connected to the resonance circuit;

the resonant capacitor adjustment circuit is connected to the resonance circuit; and the Q value detection circuit is connected to the resonance circuit;

the resonant capacitor adjustment circuit comprises at least a second capacitor;

the controller is configured to: when a Q value of the transmit coil is detected, control the resonant capacitor adjustment circuit to operate, so that the first capacitor and the second capacitor are connected in parallel;

the Q value detection circuit is configured to obtain a voltage signal representing a Q value, and send the voltage signal to the controller; and the controller is configured to obtain the Q value based on the voltage signal, and when the Q value is greater than a preset threshold, determine that a stylus is attached to the electronic device.

2. The device according to claim 1, wherein the resonant capacitor adjustment circuit comprises: a switch; wherein a first terminal of the first capacitor is connected to a first output terminal of the inverter circuit, a second terminal of the first capacitor is connected to a first terminal of the transmit coil, and a second terminal of the transmit coil is connected to a second output terminal of the inverter circuit;

the second capacitor and the switch are connected in series and then connected between the second terminal of the first capacitor and a ground; and the controller is configured to control the switch to close, so that the resonant capacitor adjustment circuit operates; and control the switch to open, so that the resonant capacitor adjustment circuit exits operation.

3. The device according to claim 2, wherein the switch comprises a first positive channel metal oxide semiconductor (PMOS) transistor and a second PMOS transistor; wherein the first PMOS transistor and the second PMOS transistor are connected in series, and a body diode of the first PMOS transistor and a body diode of the second PMOS transistor are reversed.

4. The device according to claim 1, wherein the Q value detection circuit further comprises: a direct current blocking circuit and a filter circuit; wherein a first terminal of the direct current blocking circuit is connected to the resonance circuit, a second terminal of the direct current blocking circuit is connected to a first terminal of the filter circuit, and a second terminal of the filter circuit is connected to the controller.

5. The device according to claim 4, wherein the Q value detection circuit comprises: a first diode and a voltage divider circuit; wherein a first terminal of the voltage divider circuit is configured to be connected to a first power supply, a second terminal of the voltage divider circuit is grounded, and the filter circuit is connected to a third terminal of the voltage divider circuit; and the third terminal of the voltage divider circuit is connected to the second terminal of the direct current blocking circuit, the second terminal of the direct current blocking circuit is connected to an anode of the first diode, and a cathode of the first diode is connected to the first terminal of the filter circuit.

6. The device according to claim 5, wherein the filter circuit comprises: a first resistor, a second resistor, a third capacitor, a third resistor, and a fourth capacitor; wherein a first terminal of the first resistor is connected to the cathode of the first diode, the anode of the first diode is connected to the second terminal of the direct current blocking circuit, a second terminal of the first resistor is connected to a first terminal of the second resistor, and a second terminal of the second resistor is grounded; and a first terminal of the third resistor is connected to the second terminal of the first resistor, a first terminal of the third capacitor is connected to the first terminal of the third resistor, a second terminal of the third resistor is connected to an output terminal of the filter circuit, a second terminal of the third capacitor is grounded, a first terminal of the fourth capacitor is connected to the output terminal of the filter circuit, and a second terminal of the fourth capacitor is grounded.

7. The device according to claim 5, wherein the voltage divider circuit comprises:

a fifth resistor and a sixth resistor; wherein a first terminal of the fifth resistor is connected to the first terminal of the voltage divider circuit, a second terminal of the fifth resistor is connected to the third terminal of the voltage divider circuit, the second terminal of the fifth resistor is connected to a first terminal of the sixth resistor, and a second terminal of the sixth resistor is connected to the second terminal of the voltage divider circuit.

8. The device according to claim 1, comprising: a pulse source circuit, wherein the pulse source circuit comprises a fourth resistor and a second diode; and a first terminal of the fourth resistor is connected to a second power supply, a second terminal of the fourth resistor is connected to an anode of the second diode, and a cathode of the second diode is connected to the resonance circuit.

9. The device according to claim 1, wherein the controller is further configured to: after determining that the stylus is attached to the electronic device, control the resonant capacitor adjustment circuit to exit operation and the transmit coil to wirelessly charge the stylus.

10. The device according to claim 1, wherein a magnetic attraction device is disposed at a top end of the electronic device, and the magnetic attraction device is configured to attract the stylus.

11. A stylus in-position determining method, applied to an electronic device, wherein the electronic device comprises: an inverter circuit, a resonance circuit, a resonant capacitor adjustment circuit, and a Q value detection circuit; wherein the resonance circuit comprises a first capacitor and a transmit coil that are connected in series; an output terminal of the inverter circuit is connected to the resonance circuit; the resonant capacitor adjustment circuit is connected to the resonance circuit; the Q value detection circuit is connected to the resonance circuit; the resonant capacitor adjustment circuit comprises at least a second capacitor; and the Q value detection circuit is configured to obtain a voltage signal representing a Q value; and the method comprises:

when a Q value of the transmit coil is detected, controlling the resonant capacitor adjustment circuit to operate, so that the first capacitor and the second capacitor are connected in parallel;

obtaining the Q value based on the voltage signal; and when the Q value is greater than a preset threshold, determining that the stylus is attached to the electronic device.

12. The method according to claim 11, comprising:

after determining that the stylus is attached to the electronic device, controlling the resonant capacitor adjustment circuit to exit operation and controlling the transmit coil to wirelessly charge the stylus.

* * * * *